United States Patent [19]

Force

[11] 3,943,117
[45] Mar. 9, 1976

[54] PROCESS FOR IMPROVING TALL OIL PITCH

[75] Inventor: Carlton G. Force, Mount Pleasant, S.C.

[73] Assignee: Westvaco Corporation, New York, N.Y.

[22] Filed: Dec. 2, 1974

[21] Appl. No.: 528,991

[52] U.S. Cl............................... 260/97.5; 260/97.6
[51] Int. Cl.$^2$............................................. C09F 1/00
[58] Field of Search........................ 260/97.5, 97.6

[56] References Cited
UNITED STATES PATENTS 2,107,287  2/1938  Curran............................... 260/97.5
3,242,160  3/1966  Barrett.............................. 260/97.5

*Primary Examiner*—Donald E. Czaja
*Assistant Examiner*—W. E. Parker
*Attorney, Agent, or Firm*—Richard L. Schmalz; Ernest B. Lipscomb, III

[57] ABSTRACT

A process is disclosed for saponifying tall oil pitch. The process involves saponifying tall oil pitch in an aqueous solution having a solids content of 5% to 99% with at least 0.00026% by weight of a water-soluble cationic amine catalyst and a slight amount more of a saponifying agent than is required to form soaps from the free acid present in the pitch at a temperature above 50°C. to free the fatty acid soaps and rosin acid soaps from their esters.

8 Claims, No Drawings

PROCESS FOR IMPROVING TALL OIL PITCH

BACKGROUND OF THE INVENTION

Field of the Invention

This invention relates to a process for saponifying tall oil pitch. More particularly, this invention relates to a process for hydrolyzing the fatty acid esters found in a tall oil pitch fraction using small amounts of a cationic amine catalyst at specific conditions.

In the tree, fatty acids are primarily present as triglycerides with some as free fatty acids and a minor percentage as sterol esters. Rosins are present in the tree as free acids mixed with terpenes and other essential oils in a semi-solid mixture known as oleoresin. The majority of the sterols, which function as plant hormones, and the higher fatty alcohols, such as lignoceryl alcohol, are probably present as free alcohols. Hydrolysis of the glycerides to free fatty acids and glycerol occurs by alkaline catalysis in the pulping process.

The fatty acid soaps, rosin acid soaps and unsaponifiables are insoluble in the pulping liquor and are separated therefrom by skimming. The soap skimmings are acidified to form crude tall oil. The crude tall oil contains, among other constituents, its more valuable fatty acids and rosin acids; and it is desirable to recover these materials. The separation of fatty acids from rosin acids is accomplished by distillation. The high temperature and low pressure required for tall oil distillation is conducive to splitting out water between the organic acids and any sterol or long chain fatty alcohol molecules present in the crude tall oil to form esters. These high boiling point esters are the principal components in tall oil pitch, which is the residue from the distillation of crude tall oil. Small quantities of residual lignin and other non-volatile trace materials in tall oil are also present in pitch.

Tall oil pitch, being a residue material, has found uses in areas where color and performance are not critical such as cement additives (U.S. Pat. No. 2,510,776), in asphalt emulsions, certain resins and paper sizes. In any event, attempts have been made to hydrolyze the tall oil pitch esters. If the esters can be hydrolyzed, the acid number is raised making the pitch more valuable and expanding the areas of its use, such as a collector for phosphate in its purification by flotation. However, the tall oil pitch esters are very unreactive and harsh conditions have been found necessary for their saponification. For example, long reflux with aqueous alkali at a temperature above 345°F. (174°C.) and a pressure of about 105 p.s.i.

In view of the foregoing, it should be apparent that there exists a need in the art for improving tall oil pitch. It is, therefore, a primary object of this invention to provide a process for saponifying tall oil pitch. Another object of this invention is to provide a process for hydrolyzing the esters found in tall oil pitch using a cationic amine catalyst.

Still another object of this invention is to provide a process for increasing the acid number of tall oil pitch.

Other objects, features and advantages of this invention will be evident from the following detailed description of the invention.

SUMMARY OF THE INVENTION

It has been found that the fatty acid esters found in a tall oil pitch fraction may be hydrolyzed by saponifying pitch in an aqueous solution at a pitch solids content between 5% and 99%, preferably 70% to 90%, with at least 0.00026% by weight of a water-soluble cationic amine soap, preferably 0.0026% to 1.0%, and at least a slight amount more saponifying agent than is required to form soaps from the free acid present in the pitch, generally 0.43 moles to 4.0 moles per mole of pitch carboxylate of a saponifying agent, preferably 0.8 moles to 1.8 moles, such as sodium hydroxide at a temperature above 50°C., preferably 80°C. to 174°C., to thereby free the fatty acid soaps and rosin acid soaps from their esters, as shown by a significant increase in the acid number when the soaps are converted to free acids.

DETAILED DESCRIPTION OF THE INVENTION

It has been found that the fatty acid esters in a pitch fraction can be saponified with a cationic amine soap catalyst. Although the exact nature of the reaction has not been clearly established, it appears desirable to establish a pitch/water/cationic soap catalyst system where reverse cationic soap micelles in pitch as the continuous phase predominate. Mechanistically, ester hydrolysis in alkaline medium is accomplished by attack on the relatively electron deficient carbonyl carbon atom by the electron rich hydroxyl ion followed by elimination of the alcoxide anion. Stability provided by the carboxyl resonance structure prevents reversibility of this elimination step.

Promotion of the equilibrium reaction toward the intermediate required for dealkoxylation can be achieved by increasing the hydroxyl ion concentration. It is theorized that if the ester to be hydrolyzed penetrates the micelle structure of a cationic soap it will enter a high hydroxyl ion concentration region at the interface between the amine heads of the soap molecules and the aqueous phase. This region is provided by attraction of the negative hydroxyl ions in the aqueous phase into the double layer developed at the interface by the positively charged amine groups in the soap molecules making up the micelles. Such an interface exists whether the micelles are of the normal type with an organic core and polar surface in an aqueous bulk solution or of the reverse type with a polar core and organic surface in an organic bulk solution. As the pitch concentration increases above a few percent solids, reverse micelles may exist together with normal micelles and for other soap configuration in the system. It was found that conditions which increase the ratio of these reverse micelles to normal micelles improve hydrolysis up to a point.

Thus, the solids content of the aqueous pitch solution has a pronounced effect on the hydrolysis reaction, as clearly shown in Example 1. Hydrolysis of the fatty acid esters under identical conditions is more effective on high solids content pitch solutions than on low solids content pitch solutions. Although hydrolysis using the cationic amine soap catalyst will occur in the predominately normal micelle range, i.e., say about 5% solids, the preferred solids content, however, is in the reverse micelle range from about 70% solids to about 90% solids. The upper limit on pitch solids concentration is about 99% solids above which the water concentration is inadequate for appreciable reaction. The desired solids content may be obtained by adding the correct amount of water to pitch which has been warmed to make it more fluid or in combination with the saponifying agent or catalyst.

The catalysts used in the process of this invention are the water-soluble cationic amine soaps. It is, of course, essential to the process of this invention that the cationic amine soaps be water-soluble.

Suitable amines for use in preparing the soaps of the invention include primary, secondary and tertiary mono- and polyamines such as aliphatic, including cycloaliphatic, mono- and polyamines. The amines generally may contain up to about 20, preferably above about 6, carbon atoms in their structural formula. For example, isopropylamine, n-propylamine, diisopropylamine, n-butylamine, di-n-butylamine, tri-n-butylamine, triethylamine, cyclohexylamine, ethylene diamine, diethylene triamine, triethylene tetramine, tetraethylene pentamine, etc.; heterocyclic N- containing mono- and polyamines, for example, morpholine, N-methyl-morpholine, 4(2-aminoethoxy) ethylmorpholine, 2-(4-morpholinylethoxy) ethanol, bis-2-(4-morpholinyl) ethyl ether, piperazine, N-aminoethylpiperazine, N-hydroxy-ethyl-piperazine, pyridazine, pyrrole, pyrrolidine, pyridine, piperadine, pyrimidine, pyridazine, etc. Mixtures of the foregoing such as residue products resulting from the commercial production of pure or essentially pure amines are especially desirable for use in preparing the additive of the invention due to the relative low-cost of such products. Additionally, long chain fatty acid amines are especially useful such as cocoa fatty acid primary amines, dilauryl secondary amine and N,N dimethyl dodecyl tertiary amine.

Suitable quaternary cationic amine soaps include, for example, aliphatic and aryl amines having from 10 carbon atoms to 22 carbon atoms such as dodecyl phenol quaternary amine soaps, cetyl trimethyl ammonium bromide, cetyl trimethyl ammonium chloride, dodecyl trimethyl ammonium chloride, and nonyl trimethyl ammonium chloride. Because of their high reactivity, the quaternary amines soaps are preferred, especially cetyl trimethyl ammonium bromide and cetyl trimethyl ammonium chloride.

While only 0.00026% by weight of pitch solids of the cationic amine catalyst need by employed to obtain any significant results, it is preferable to use between about 0.0026% and 0.26% by weight of pitch solids. Above about 1.0% there is little advantage to be gained, because the small amount of improvement can generally not justify the increase in cost of cationic amine catalyst required to obtain the improvement.

The saponifying agents used to perform the hydrolysis are those typical saponifying agents which are well known in the art. These saponifying agents include, for example, sodium hydroxide (caustic) and potassium hydroxide, with sodium hydroxide being preferred. The amount of saponifying agent used may in part be determined by the amount of free acids present in the pitch. Thus, at least a slight excess more saponifying agent than is required to form soaps from the free acids present in the pitch is needed. Thus, about 0.03 moles of free saponifying agent (not reacted with free acids) per ester group is used. For example, a pitch having an acid number of 45 will need 0.40 moles of caustic to convert the free acid; thus, 0.43 moles of caustic per pitch carboxylate is added. While the effective amount of saponifying agent used may vary up to 4.0 moles of saponifying agent per pitch carboxylate, the preferred range is from about 0.8 moles of agent per carboxylate to about 1.8 moles of agent per carboxylate. Little advantage is obtained by adding above about 1.8 moles of saponifying agent per mole of pitch carboxylate; and above about 3 moles of saponifying agent per mole of carboxylate, the acid number and yield begin to slightly decrease.

In this reaction, as in many reactions, the temperature and time of treatment are interrelated but not directly dependent on one another. Thus, generally speaking, the higher the temperature the shorter will be the time required to reach a desired acid number or percent yield. As a general rule, the time of reaction is not extremely important. However, at a reflux or lower temperatures at least 10 minutes should be employed. The reaction proceeds quite rapidly at reflux temperature with a large increase in acid number and yield occurring in a relatively short period of time, say about 30 minutes. As the reaction proceeds, it becomes more and more difficult to hydrolyze the remaining esters resulting in a decrease in the rate of acid number increase and yield. At reflux temperature, reaction times exceeding about 4 hours fail to produce any significant improvements. Although reflux temperatures at atmospheric pressure or higher temperatures in pressure vessels appear to be the best, lower temperatures may be used with longer reaction times needed to get equivalent results. However, as a practical matter, a temperature of at least 50°C. is recommended to give the pitch sufficient fluidity for good mixing. At this lower temperature, the reaction time may be as long as 24 hours to get satisfactory percent conversion. The preferred temperature range is between about 80°C. and 174°C. As a result, the time and temperature employed is primarily an economic one of balancing the cost with acid number and yield improvements obtained. The hydrolysis reaction is normally carried out at atmospheric pressure; however, where higher reaction temperatures are used, and/or ammonium hydroxide is the saponifying agent, it is desirable to employ pressures up to about 150 p.s.i.

The thus treated pitch soaps, because of their increased acid number, may be used in quick break anionic asphalt emulsions or as a component in anionic phosphate ore flotation reagents.

In a preferred embodiment of the process of this invention, the bottom fraction (pitch) of a crude tall oil distillation having an acid number of about 45 is warmed until it is fluid and in no particular order the following is added; water is added until the solids concentration is about 86% by weight pitch; about 1.7 moles of caustic per mole of pitch carboxylate is added, along with 0.026% by weight of pitch of cetyl trimethyl ammonium bromide and the mixture heated under reflux for 30 minutes. The saponified materials thus treated will have an acid number above 90 and a yield of available acids above 85%. This process has the advantage of being relatively inexpensive and thereby making valuable materials out of a material which for years has predominately been used for its fuel value.

The following examples serve to illustrate the process of this invention.

EXAMPLE 1

Saponification was accomplished on a tall oil pitch having an acid number of 45 and a saponification number of 112. A pitch sample of 448 grams was heated in a flask to 90°C. To the flask was then added 128 grams of a 50% caustic solution (1.73 moles/mole of carboxylate) which produced a system having solids of 86%. An aqueous solution of cetyl trimethyl ammonium bromide (CTAB) was prepared by dissolving 30.6 grams of cetyl trimethyl ammonium bromide in 100 grams of water and warmed to about 50°C. From the warm aqueous solution of CTAB, 0.5 gram was taken and added to the pitch along with one drop of a silicone defoamer. A reflux condenser was placed on the flask and the contents boiled for 30 minutes. The saponification product was acidified with sulfric acid to free the fatty acids and rosin acid from their soaps, and the acid number was determined according to A.S.T.M. D803-65.

The acid number of the hydrolysis reaction product was 96.8 and the saponification number was 106.0, indicating that saponification of the fatty acids contained in the pitch sample had occurred.

EXAMPLE 2

This example is to illustrate the effect of pitch solids content on hydrolysis. Thus, for comparision, pitch samples were compared at varying solids concentration from 5.0% solids to almost 100% solids using the starting pitch (acid number 45 and saponification number 112) and general procedure as set out in Example 1. The effect of percent solids on degree of hydrolysis is shown in Table I.

TABLE I

| % Solids | Moles NaOH Per Pitch Carboxylate | Catalyst Concentration % of Pitch | Reflux Time, Hrs. | Acid Number | % of Total Available Acids |
|---|---|---|---|---|---|
| 5.0 | 1.79 | 0.026 | 3 | 53.0 | 44 |
| 20.0 | 1.79 | 0.026 | 2 | 61.2 | 55 |
| 50.0 | 1.79 | 0.36 | 2 | 87.7 | 78 |
| 80.1 | 1.79 | 0.35 | 2 | 90.3 | 80 |
| 88.6 | 1.79 | 0.035 | 2 | 92.4 | 83 |
| 86.6 | 1.73 | 0.026 | 2 | 97.4 | 87 |
| 96.0 | 1.73 | 0.026 | 2 | 98.1 | 87 |
| 99+ | 1.73 | 0.026 | 2 | 42.7* | 35 |

Note:
*Starting pitch had an acid number of 40.8.

The results show that the solids level for maximum hydrolysis lies between about 80% and 96% solids.

EXAMPLE 3

This example illustrates the effect of catalyst level on hydrolysis. The general procedure of Example 1 was repeated by varying the level of cetyl trimethyl ammonium bromide catalyst of a pitch having an acid number of 45 at 86.6% solids and 1.73 moles NaOH/mole pitch carboxylate. The results are shown in Table II.

TABLE II

| % Catalyst Based on Pitch | Acid Number | % of Total Available Acids |
|---|---|---|
| - 0 - | 45.0 | 40 |
| 0.00026 | 62.6 | 56 |
| 0.0026 | 90.2 | 80 |
| 0.026 | 97.4 | 87 |
| 0.036 | 92.4 | 82.5 |
| 0.36 | 90.3 | 80 |
| 1.0 | 98.6 | 87 |

The results in the table show that 0.00026% by weight of CTAB makes significant improvement in acid number and percent total available acids.

EXAMPLE 4

This example is to illustrate the various water-soluble cationic amine soaps which may be used in the process of this invention. The pitch samples (saponification number 122) at 95% solids and 0.026% catalyst level were refluxed for 30 minutes with 0.66 moles NaOH/mole pitch carboxylate. The various catalysts used and the results obtained are shown in Table III.

TABLE III

| | Acid Number | % of Total Available Acids |
|---|---|---|
| Starting Pitch | 40.8 | 33 |
| Cetyl Trimethyl Ammonium Chloride | 77.5 | 64 |
| Dodecyl Phenol Quaternary Amine Chloride | 89.8 | 74 |
| Secondary Amine[1] | 78.2 | 64 |
| Dodecyl Trimethyl Ammonium Chloride | 77.5 | 64 |
| Cocoanut Fatty Acid Primary Amine[2] | 68.0 | 56 |
| Dilauryl Secondary Amine | 68.7 | 56 |
| Dodecyl Tertiary Amine | 68.0 | 56 |

Notes:
[1]Redicote E-11 manufactured by Armour Ind. Chemicals.
[2]Armeen C manufactured by Armour & Company, Chicago, Illinois, is a mixture of long chain primary amines.

These results show that water-soluble primary, secondary, tertiary and quaternary cationic amine soaps work well in the process of this invention.

EXAMPLE 5

The amount of saponifying agent present during the react has some effect on the degree of hydrolysis. Pitch samples (acid number 45 and saponification number 112) were saponified using the general procedure of Example 1 with 0.026% CTAB catalyst for 30 minutes at reflux. The results are shown in Table IV.

TABLE IV

| Moles NaOH Per Pitch Carboxylate | % Solids | Acid Number | % of Total Available Acids |
|---|---|---|---|
| 0.43 | 86.0 | 51.6 | 46 |
| 0.87 | 86.0 | 87.7 | 78 |
| 0.99 | 91.2 | 86.3 | 77 |
| 1.40 | 88.9 | 92.9 | 83 |
| 1.73 | 86.6 | 96.8 | 86 |
| 2.79 | 82.5 | 99.5 | 89 |
| 4.19 | 78.2 | 93.5 | 83 |

Little advantage is achieved by adding above about 4.0 moles NaOH/mole of pitch carboxylate.

EXAMPLE 6

This example illustrates the effect of reflux time on hydrolysis using samples of pitch having an acid number of 45 and following the general procedure of Example 1 at 1.73 moles NaOH/mole pitch carboxylate and 0.026% CTAB catalyst and 86.6% pitch solids. The reaction goes most readily at reflux at temperature of about 110°C. At this temperature, sufficient agitation is provided by boiling to eliminate the need for stirring in the reaction vessel. The results are shown in Table V below.

TABLE V

| Reflux Time | Acid Number | % of Total Available Acids |
| --- | --- | --- |
| 0 Min. | 45 | 40 |
| 10 Min. | 92.9 | 83 |
| 20 Min. | 92.9 | 83 |
| 30 Min. | 96.8 | 86 |
| 100 Min. | 97.5 | 87 |
| 120 Min. | 97.4 | 87 |
| 135 Min. | 98.8 | 88 |

The results show that a significant increase in acid number is obtained after only 10 minutes with slight improvements continuing after 30 minutes.

EXAMPLE 7

This example illustrates the temperature dependency of the reaction. Reduction in temperature apparently shifts the equilibrium constant so that longer reaction times are required. Stirring is necessary at temperatures below reflux. Otherwise, the caustic solution will separate from the pitch and no reaction will take place. However, foaming does not occur spontaneously below reflux temperature; and antifoam is not needed unless the stirring rate is excessive. Hydrolysis times at two temperatures are shown in Table VI. It should be noted that these reactions were carried out with 0.87 mole NaOH instead of the 1.73 moles used for the reflux temperature data in Table IV. Therefore, the maximum degree of saponification is somewhat less.

TABLE VI

| | 93°C. | | | 85°C. | | |
| --- | --- | --- | --- | --- | --- | --- |
| Time | % Solids | Acid Number | % of Total Available Acids | % Solids | Acid Number | % of Total Available Acids |
| 60 Min. | 85.0 | 74.2 | 66 | 86.0 | 74.2 | 66 |
| 120 Min. | 85.0 | 80.2 | 72 | 86.0 | 83.2 | 74 |
| 180 Min. | 85.0 | 89.8 | 80 | 86.0 | 85.4 | 76 |
| 300 Min. | 85.0 | 89.8 | 80 | 86.0 | 85.4 | 76 |

Reaction time is increased from 30 minutes at reflux to 3 hours at temperatures below reflux, but the ultimate degree of hydrolysis did not appear to be greatly affected. Using the same proportions at 175°C., an acid number of 80 was reached in about 15 minutes.

While this invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for producing improved tall oil pitch which comprises, saponifying an aqueous solution of tall oil pitch at a solids concentration of 5% to 99% with at least 0.00026% by weight of a water-soluble cationic amine soap catalyst and a slight amount more of a saponifying agent than is required to form soaps from the free fatty acids and rosin acids present in the pitch at a temperature of at least 50°C. to free the fatty acid soaps and rosin acid soaps from their esters.

2. The process of claim 1 wherein said cationic amine soap is a quaternary amine soap.

3. The process of claim 1 wherein said cationic amine soap catalyst is a member of the group consisting essentially of cetyl trimethyl ammonium bromide, cetyl trimethyl ammonium chloride, dodecyl trimethyl ammonium amine, nonyl trimethyl ammonium chloride and dodecyl phenol quaternary amine soaps.

4. The process of claim 1 wherein said pitch solution has a solids content of from 70% to 90% by weight pitch.

5. The process of claim 3 wherein said cationic amine soap catalyst is present in an amount from 0.0026% to 1.0%.

6. The process of claim 1 wherein said saponifying agent is sodium hydroxide and is present in an amount from 0.8 moles of sodium hydroxide per pitch carboxylate to 1.8 moles of sodium hydroxide per pitch carboxylate.

7. The process of claim 1 wherein said temperature is between about 80°C. and 174°C. and said time is from 10 minutes to 4 hours.

8. A process for producing improved tall oil pitch which comprises, saponifying an aqueous solution of tall oil pitch at a solids concentration from 5 to 99% with at least 0.0026% by weight of a quaternary amine soap catalyst and a slight amount more of a saponifying agent than is required to form soaps from the free fatty acids and rosin acids present in the pitch at a temperature of at least 50°C. to free the fatty acid soaps and rosin acid soaps from their esters.

* * * * *